(12) United States Patent
Snyder et al.

(10) Patent No.: US 10,379,724 B2
(45) Date of Patent: Aug. 13, 2019

(54) PROVIDING A USER INTERFACE FOR CUSTOMIZING STATE TRANSITIONS OF PANES IN A BOUNDING WINDOW

(71) Applicant: salesforce.com, inc., San Francisco, CA (US)

(72) Inventors: Benjamin Snyder, Royal Oak, MI (US); Michael Wang, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 254 days.

(21) Appl. No.: 15/496,325

(22) Filed: Apr. 25, 2017

(65) Prior Publication Data

US 2017/0228147 A1  Aug. 10, 2017

Related U.S. Application Data

(63) Continuation of application No. 14/469,354, filed on Aug. 26, 2014, now Pat. No. 9,665,261.

(60) Provisional application No. 61/896,237, filed on Oct. 28, 2013.

(51) Int. Cl.
  *G06F 3/0484* (2013.01)
  *G06F 3/0481* (2013.01)

(52) U.S. Cl.
  CPC ........ *G06F 3/04847* (2013.01); *G06F 3/0481* (2013.01); *G06F 2203/04803* (2013.01)

(58) Field of Classification Search
  CPC ............... G06F 3/04847; G06F 3/0481; G06F 2203/04803
  See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |

(Continued)

FOREIGN PATENT DOCUMENTS

| | | |
|---|---|---|
| EP | 2972981 | 1/2016 |
| JP | 2016-503070 A | 2/2016 |
| WO | 2014/144796 | 9/2014 |

OTHER PUBLICATIONS

U.S. Appl. No. 15/398,022, filed Jan. 4, 2017, Al-Alami et al.

(Continued)

*Primary Examiner* — Anil K Bhargava
(74) *Attorney, Agent, or Firm* — Weaver Austin Villeneuve & Sampson LLP

(57) ABSTRACT

Disclosed are examples of systems, apparatus, methods and computer program products for providing a user interface customizable to define state transitions of panes in a bounding window. For example, a bounding window including one or more resizable panes is displayed in a user interface on a display device. Breakpoints situated at respective spatial positions in the bounding window are graphically represented in the user interface. Each breakpoint defines a transition of a pane from one state to another when the pane is resized to traverse the breakpoint. The spatial position of one or more of the breakpoints can be updated in accordance with a request indicating user customization of breakpoints.

20 Claims, 9 Drawing Sheets

(56) References Cited

U.S. PATENT DOCUMENTS

| | | |
|---|---|---|
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,063,632 B2 | 6/2015 | Beechuk et al. |
| 9,398,156 B2 | 7/2016 | Snyder et al. |
| 9,529,488 B2 | 12/2016 | Beechuk et al. |
| 9,569,060 B2 | 2/2017 | Al-Alami et al. |
| 9,665,261 B2 | 5/2017 | Snyder et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |

(56) References Cited

U.S. PATENT DOCUMENTS

| | | |
|---|---|---|
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshaysky et al. |
| 2011/0247051 A1 | 10/2011 | Bulumulla et al. |
| 2012/0042218 A1 | 2/2012 | Cinarkaya et al. |
| 2012/0143969 A1* | 6/2012 | Shenoy .................. G06Q 10/10 709/206 |
| 2012/0233137 A1 | 9/2012 | Jakobson et al. |
| 2012/0290407 A1 | 11/2012 | Hubbard et al. |
| 2012/0297324 A1* | 11/2012 | Dollar .................. G06F 16/957 715/760 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0300747 A1* | 11/2013 | Wong .................... G06T 11/206 345/440.2 |
| 2014/0032597 A1 | 1/2014 | Ellis et al. |
| 2014/0032713 A1 | 1/2014 | Phan et al. |
| 2014/0236972 A1* | 8/2014 | William ................ G06F 16/211 707/755 |
| 2014/0280329 A1 | 9/2014 | Beechuk et al. |
| 2014/0280577 A1 | 9/2014 | Beechuk et al. |
| 2014/0310608 A1 | 10/2014 | Snyder et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0121299 A1 | 4/2015 | Snyder et al. |
| 2015/0142596 A1 | 5/2015 | Jakobson et al. |
| 2015/0143248 A1 | 5/2015 | Beechuk et al. |
| 2015/0172563 A1 | 6/2015 | Jakobson et al. |
| 2017/0068646 A1 | 3/2017 | Beechuk et al. |
| 2017/0075540 A1 | 3/2017 | Hausler et al. |
| 2017/0076252 A1 | 3/2017 | Hausler et al. |

OTHER PUBLICATIONS

U.S. Office Action dated Oct. 19, 2014, issued in U.S. Appl. No. 14/469,354.

"Google Plus Users", Google+Ripples, Oct. 31, 2011 [retrieved on Feb. 21, 2012 from Internet at http://www.googleplusers.com/google-ripples.html], 3 pages.

U.S. Notice of Allowance dated Jan. 27, 2017 issued in U.S. Appl. No. 14/469,354.

* cited by examiner

PROVIDING A USER INTERFACE FOR CUSTOMIZING STATE TRANSITIONS OF PANES IN A BOUNDING WINDOW

PRIORITY DATA

This patent document claims is a continuation of and claims priority to and commonly assigned U.S. patent application Ser. No. 14/469,354, titled "PROVIDING A USER INTERFACE FOR CUSTOMIZING STATE TRANSITIONS OF PANES IN A BOUNDING WINDOW", by Snyder et al., filed on Aug. 26, 2014, which claims priority to U.S. Provisional Patent Application No. 61/896,237, titled "System and Method for Predetermined Resizing of Panes in Bounding Windows", by Benjamin Snyder, filed on Oct. 28, 2013. Each of U.S. patent application Ser. No. 14/469,354 and U.S. Provisional Patent Application No. 61/896,237 is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to display of panes in a bounding window on a display device. More specifically, this patent document discloses techniques for providing a user interface to customize state transitions of panes in a bounding window.

BACKGROUND

"Cloud computing" services provide shared resources, applications, and information to computers and other devices upon request. In cloud computing environments, services can be provided by one or more servers accessible over the Internet rather than installing software locally on in-house computer systems. Users often interact with cloud computing services via a user interface generated on a computer system. As such, how to display information in a user interface can be a consideration in a cloud computing environment.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Figure 1:
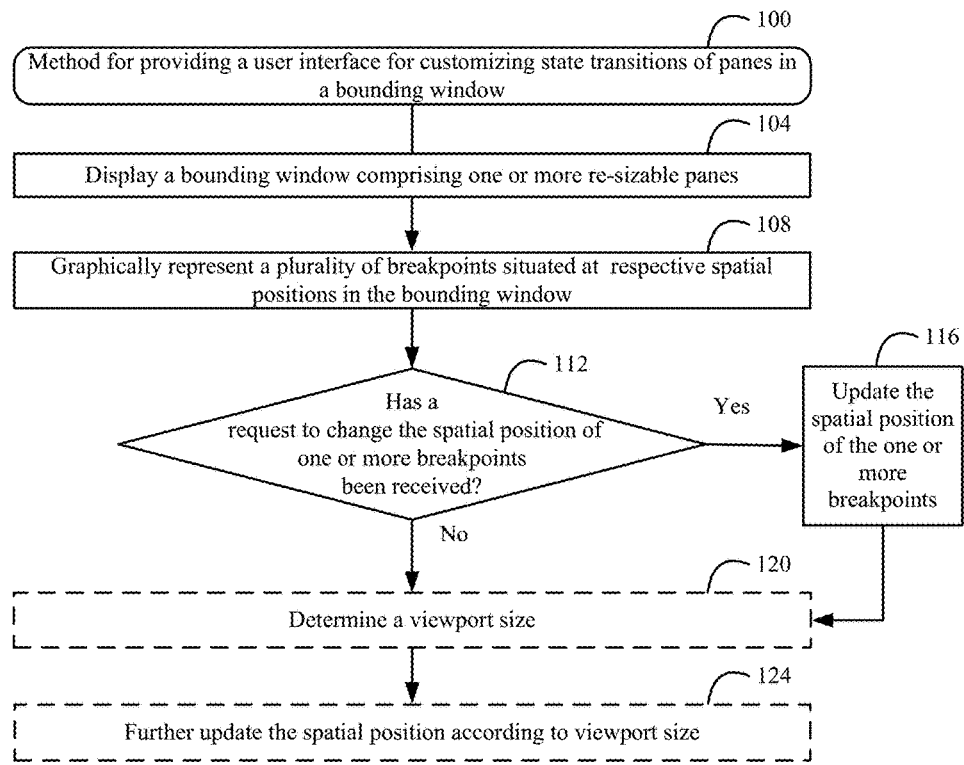
FIG. 1 shows a flowchart of an example of a computer-implemented method 100 for providing a user interface for customizing state transitions of panes in a bounding window, performed in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured to provide a user interface for customizing state transitions of panes in a bounding window. As used herein, a bounding window generally refers to a delineated portion of the display within in a graphical user interface (GUI), such as a window of a web browser. Content within a bounding window can be displayed in any number of separated panes. The consumption of information displayed in a user interface on a computing device such as a smartphone or a tablet can be hampered by a one-size-fits-all or static approach to displaying content on the device. For example, many websites provide a huge amount of content to a browser to be rendered on a display, sometimes in the form of multiple panes. Further complicating matters, a user can lose out on a great deal of information by resizing a pane such that the information in the pane is displayed in a suboptimal manner. For instance, in a traditional news website, a user might decrease the size of a pane cutting off an important part of a headline.

By way of illustration, Lars is a user viewing a presentation of a website on his tablet. A pane contains a news story about a recent Unidentified Flying Object (UFO) hoax with the headline: "Alien Invasion? No, just another UFO hoax." If Lars decreases the size of the pane, and the pane's content remains static, the headline could be truncated in a misleading manner becoming: "Alien Invasion". On the other hand, if each of the individual panes that make up the news website's layout can be automatically reconfigured based on the size of the pane, Lars could view the entire headline. Furthermore, if an author, without any programming experience, were to have the ability to customize a screen of an application or a web page's design to reconfigure layout depending on the author's preferences, such applications or web pages could become much more powerful and efficient information sources.

Along these lines, the disclosed techniques provide for the configuration of states of individual panes within a bounding window. In some implementations, a user such as a system administrator or an individual using a cloud-based service can define spatial positions of breakpoints. A breakpoint is an object, which serves to trigger a transformation in the state of a pane when the pane is resized to traverse the breakpoint. For example, the textual content within a pane might become abbreviated when the pane is decreased in size to traverse a breakpoint. Properties of breakpoints, such as the number of breakpoints in a given bounding window, can be set as defaults, customized by end users, or even set automatically. Additionally, the disclosed techniques can provide a scalable platform to provide a number of possible states without having to explicitly set each individual state setting.

A number of transformations of the display of content within a pane are possible when state changes occur. By way of illustration, Jaquelin, a customer service representative at Acme Corporation, is viewing a bounding window containing a list of cases or other types of Customer Relationship Management (CRM) objects in one pane and a list of updates for a selected case in another pane. Jaquelin might be interested in finding out more about aggregate trends in cases within the last several months rather than examining specific updates. Thus, Jaquelin might enlarge the pane containing the list of cases, traversing several breakpoints as she does so. In some implementations, as a result of traversing one or more breakpoints, more information is displayed in the list of cases, such as new columns being added to the list or more details being added to each list entry. On the flip side of the same coin, enlarging the pane for the list of cases correspondingly reduces the size of the pane for the list of updates for a selected case. Such a reduced size of the pane might correspond with a summary view state, only containing the most essential information associated with each selected case.

In some implementations, the sensitivity associated with resizing a pane depends on the number of breakpoints traversed. By way of illustration, assume that the content of a resizable pane relates to a table of product and price information for Acme Corporation, a large electronics company. In one scenario, there might be only one breakpoint corresponding to two pane states. In this scenario, one state is a full-detailed view of the table while the other state is a minimized summary view of the table's content. In other scenarios, there might be more than ten breakpoints. In such scenarios, there can be a larger number of intermediate states between the full table view and the minimized table view, leading to more sensitivity associated with resizing the pane.

In some implementations, the disclosed techniques can be used on an enterprise platform, allowing system administrators to configure breakpoints without having to know intricacies of coding such breakpoints. Assume that Acme Corporation, which sells thousands of products, needs a platform with hundreds of different fields such as product name, product type, price, release date, etc. Given the high number of fields, Acme might wish to define a high number of breakpoints and states. On the other hand, assume that Sherlock runs a small startup online detective agency. Sherlock only uses the enterprise platform to display a few fields such as a case name or whether the case is solved. Given the small number of useful fields, Sherlock might only want to define a single breakpoint and two responsive states, such as a full and summary view described above.

Unfortunately for Acme Corporation as well as Sherlock, defining breakpoints using traditional techniques would not only be onerous but would often call for relatively extensive programming knowledge. Given his small operation and large caseload, Sherlock is spread thin. Making matters worse, neither Sherlock nor his lone employee John have any coding experience. In some implementations, the disclosed techniques would allow each client to separately customize an enterprise platform to its preferences without any need to code.

For example, in some implementations, the spatial position of breakpoints is completely customizable within a graphical user interface (GUI). More specifically, breakpoints can be graphically represented as lines in a GUI. Each line can be moved responsive to user input, such as clicking or dragging a line across an axis. Also or alternatively, the spatial positions of the breakpoints can be defined by a user in editable fields in a region of the user interface. User customization of breakpoints will allow Sherlock to efficiently handle his caseload without needing to hire an outside programmer. Using the disclosed techniques, Acme Corporation can also create customized breakpoints in accordance with its business model without having to expend unnecessary resources on coding.

In some implementations, the spatial positions of breakpoints might be further dependent on the size of a viewport or the type of viewing device. For instance, Juan might be viewing content on his smartphone. On the other hand, Tingting might be viewing the same content on a desktop computer with a 32-inch screen. There can be more breakpoints and transitions when content is viewed on a large monitor screen than a smartphone to compensate for the diminished size of the smartphone. For example, it might be very difficult for Juan to resize a window in a smartphone if there are 10 breakpoints, because each breakpoint might be little more than a finger's width apart. On the other hand, Tingting might appreciate 10 breakpoints when viewing the community on her 32-inch screen because the breakpoints could be spaced at easy to manage distances. There can be yet more breakpoints when content is viewed on more than one monitor at once.

The disclosed techniques can be implemented in a group or a community of users of a social networking system. An example of such a community is described in more detail below. In some implementations, when a system administrator or other user is building a community, she might want to set up breakpoints for the community. These breakpoints could be applied to all who log into the community and view it on a browser. A community might have thousands of members, leaving the system administrator with many more important duties than merely setting up breakpoints. Using the disclosed techniques and a platform such as Chatter® provided by salesforce.com, inc., the system administrator can assign a permission to a trusted user, such that the trusted user has the ability to maintain and update breakpoints.

Some implementations of the disclosed systems, apparatus, methods and computer-readable storage media are configured to be used by groups and/or communities of users in a social networking system. A community of users can exist as an entity apart from and in addition to any group or groups of such users in the social network, although some of the rights and restrictions provided to a community member may be the same or similar as those provided to a member of a group.

In some implementations, a group or community can be defined as a secure space for different stake-holders of an organization, such as employees, customers and partners of the organization, to collaborate with one another by accessing shared data, interacting with tasks and business processes, and using conversational services such as chat sessions, feed-based communication, and private messaging. The group or community can be structured and maintained as a public or private space for users having different relationships with the organization, so the users can converse and collaborate in an effective manner. The users can be of different types, such as internal or external, and/or the users can have different roles, such as employee, customer or partner, with such types and roles defining a user's relationship with the organization. For example, a partner can be an entity external to an organization that sells services and/or provides support on behalf of an employee, who is an internal user of the organization. Multiple groups or communities can be implemented, some affiliated with different organizations, and a user can navigate across the groups and communities in a seamless fashion from the user's perspective.

Each group or community can be structured so a leader, system administrator or other user having appropriate security clearance can define rules governing membership in the group or community and privileges governing: i) access and use of various community data, ii) the ability to take action and cause events to occur in relation to the group or community, and iii) the visibility of users to each other. These various privileges can be defined and customized at a granular level, for instance, with different access rights and restrictions configured on a per-user or per-type of user basis, on a per-data item or per-type of data basis, and/or on a per-action or per-type of action basis.

These and other implementations may be embodied in various types of hardware, software, firmware, and combinations thereof. For example, some techniques disclosed herein may be implemented, at least in part, by a computer program product that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

FIG. 1 shows a flowchart of an example of a computer-implemented method 100 for providing a user interface for customizing state transitions of panes in a bounding window, in accordance with some implementations. FIG. 1 is described with reference to FIGS. 3 and 4, which show examples of presentations of bounding windows comprising one or more resizable panes in the form of a GUI as displayed on a computing device, in accordance with some implementations.

Figure 3:
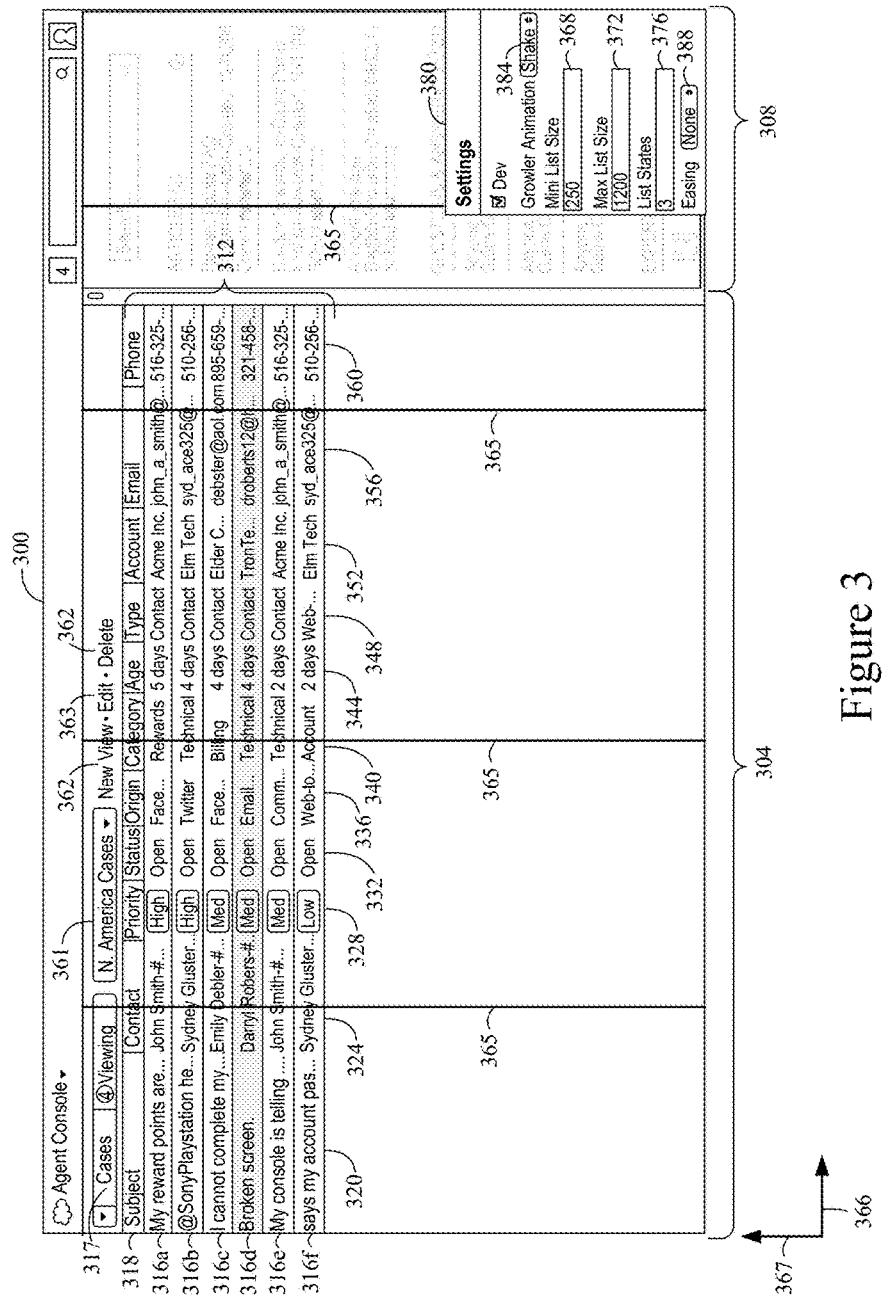
FIG. 3 shows an example of a presentation of a bounding window comprising one or more resizable panes in the form of a graphical user interface (GUI) as displayed on a computing device, performed in accordance with some implementations.

In FIG. 1, at 104, a bounding window 300 of FIG. 3 including resizable panes 304 and 308 is displayed in a user interface. Content in each bounding window and resizable pane can vary greatly across implementations. For example, content of one or more panes can include data of customer relationship management (CRM) records stored in a database associated with a business organization. Such content of pane 304 can include a list of CRM records in the form of a table 312, which is described in more detail below. Non-limiting examples of CRM records include cases, accounts, tasks, leads, contacts, contracts and opportunities.

In FIG. 3, table 312 contains information relating to 6 different cases 316a-316f. In some implementations, if a user wishes to view a table relating to a different type of CRM record, she can select a CRM record type of her choice by clicking or tapping a dropdown menu 317. The specific example of table 312 contains headings 318 and 11 columns 320-360 indicating fields of the cases: "Subject" 320, "Contact" 324, "Priority" 328, "Status" 332, "Origin" 336, "Category" 340, "Age" 344, "Type" 348, "Account" 352, "E-mail" 356, and "Phone" 360. Table 312 also includes a case location dropdown menu 361 where, a user can select a subset of cases identified as belonging to customers located in a specified geographic location. In FIG. 3, North American cases are selected. Notably, in a user can add, edit or delete a case by clicking or tapping "New View" 362, "Edit" 363, or "Delete" 364 respectively.

In contrast to the extensive and detailed content of pane 304, pane 308 shows relatively less content, some of which is grayed out. Pane 308 contains less information than pane 304 due to the relatively smaller size of pane 308.

Returning to FIG. 1, at 108, a plurality of breakpoints 365 are graphically represented in the user interface with each breakpoint being situated at a respective spatial position in the bounding window, as explained below. As described above, each breakpoint can define a transition of a pane from one of a plurality of states to another one of the states when the pane is resized to traverse the breakpoint. Such state transitions are described in more detail below.

The manner in which breakpoints are graphically represented can vary greatly across implementations. For instance, in FIG. 3, breakpoints 365 are graphically represented as vertical lines in the user interface. In some implementations, each line is configured to be dragged left-or-right along a horizontal axis 366 using a pointing device such as a mouse. In some other implementations, each line is horizontally oriented and can be moved along a vertical axis 367.

In some implementations, lines representing breakpoints can be configured to be added or deleted responsive to input from the user. For example, a user can click a graphical representation of a breakpoint and drag it off of the screen to delete a breakpoint. Also or alternatively, a user can delete a breakpoint by clicking or tapping a graphical representation of a breakpoint and typing delete or pressing a delete button. Along these lines, a user can click or a tap a region in the user interface to add a breakpoint.

In some implementations, the spatial positions of the breakpoints can be defined by a user in one or more editable fields 368, 372 and 376, in a region 380 of the user interface. An editable field can indicate a spacing between breakpoints. For instance, a user can define a width in pixels between breakpoints corresponding to a state associated with a "Mini List" in field 368 or a "Max List" in field 372. An editable field can also indicate a number of breakpoints in the user interface. For example, a user can define a number of states corresponding to a number of breakpoints in field 376.

In some implementations, region 380 may contain other user-customization options, such as growler animation dropdown menu 384. For example, in FIG. 3, a user can select a growler animation such as "shake" to select the behavior of the user interface when a call or e-mail is received.

Figure 5A:
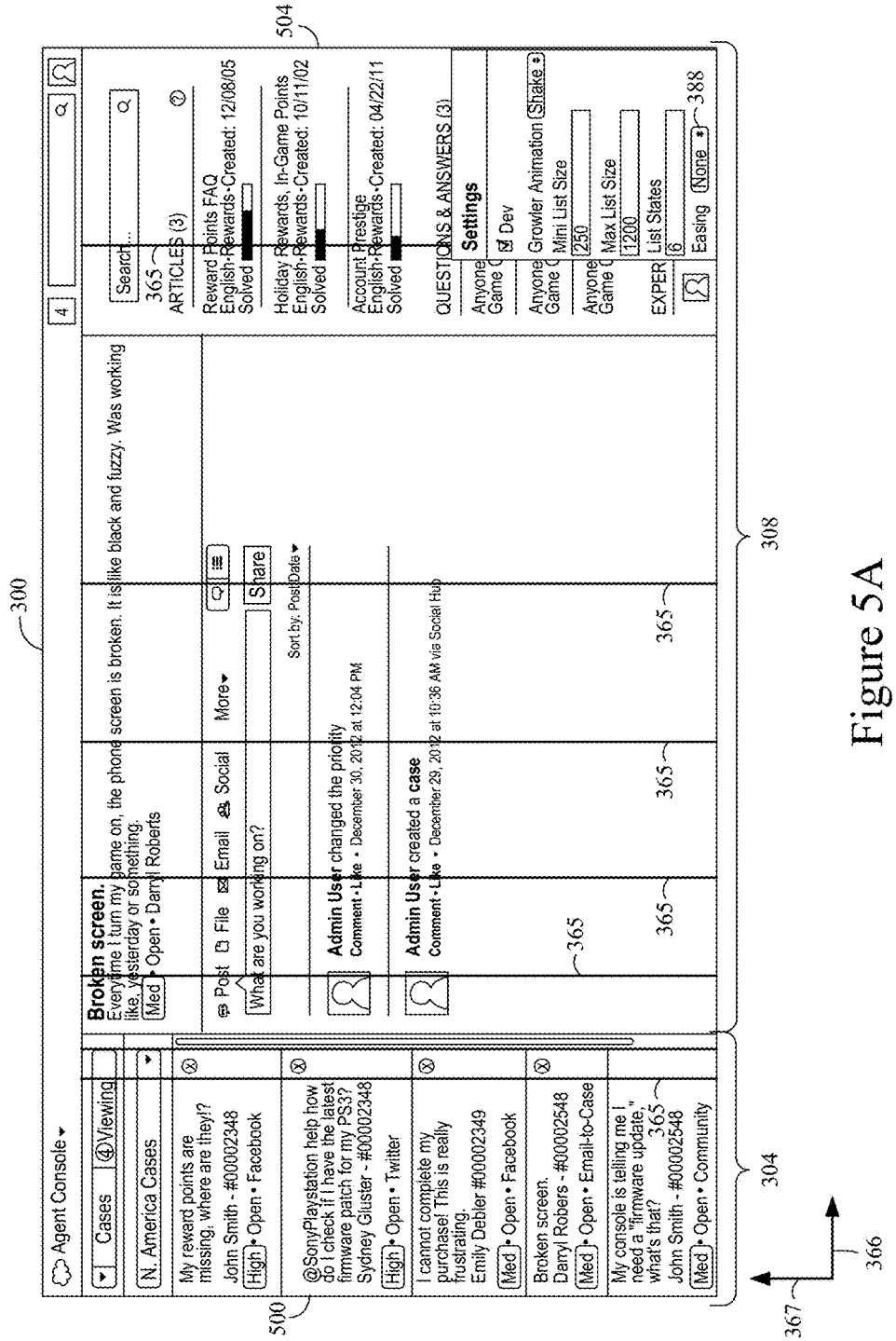
FIG. 5A shows another example of a presentation of a bounding window comprising one or more resizable panes in the form of a GUI as displayed on a computing device, performed in accordance with some implementations.
Figure 5B:
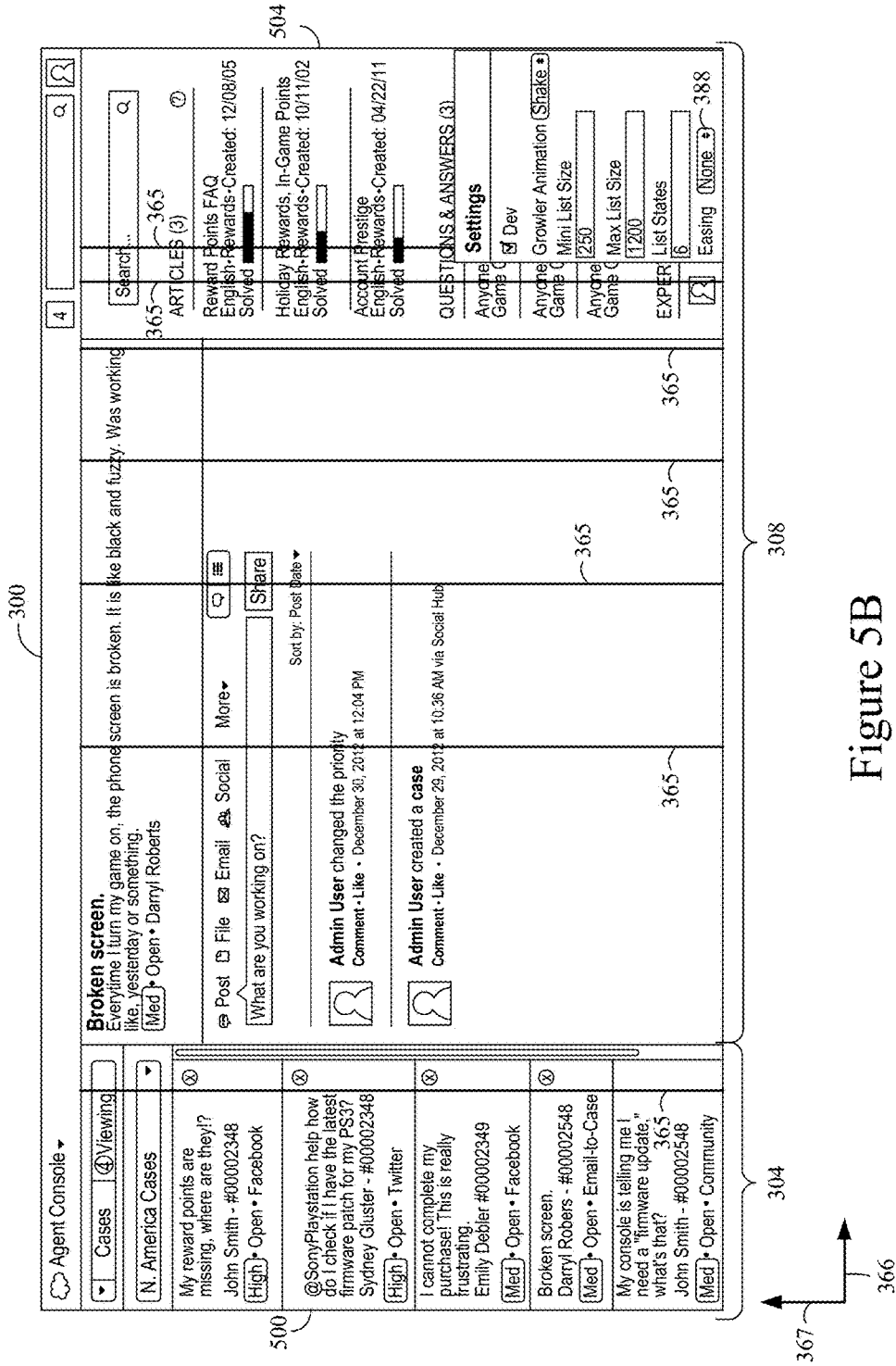
FIG. 5B shows another example of a presentation of a bounding window comprising one or more resizable panes in the form of a GUI as displayed on a computing device, performed in accordance with some implementations.

FIGS. 5A and 5B show examples where spacing between breakpoints can be based on a designated formula. For instance, a designated formula provides an increasing density of breakpoints along the horizontal axis 366 between a first border 500 and a second border 504 of bounding window 300 in FIG. 5B. Such an increasing or decreasing density of breakpoints is referred to herein as "easing". In the example of FIGS. 5A and 5B, easing provides that the breakpoints occur at further spatial intervals moving from left-to-right along a horizontal axis 366 of a bounding window (referred to herein as "easing out") or moving from right-to-left along the horizontal axis 366 of a bounding window (referred to herein as "easing in"). FIG. 5A shows an example of easing out because breakpoints occur at larger distance intervals at the right side of bounding window 300. FIG. 5B shows an example of easing in because breakpoints occur at larger distance intervals at the left side bounding window 300. In FIG. 3, easing can be specified through an easing dropdown menu 388. A user can select "none", "easing in", or "easing out" in easing dropdown menu 388. In some other implementations, easing can occur along a vertical axis 367 rather than the horizontal axis 366 pictured in FIGS. 5A and 5B. In some implementations, easing can occur along any arbitrary axis.

In FIGS. 5A and 5B, a breakpoint 365 defines a transition of a pane from one of a plurality of states to another one of the states when the pane is resized to traverse the breakpoint. Changing a pane from one state to another can lead to a change to properties of the pane, each state being at least partially defined by its properties. For example, the properties defining the state of a pane containing a table, such as 304, might include the number and size of rows or columns displayed. In FIG. 3, pane 304 is in a state where 6 rows and 11 columns are displayed. On the other hand, in FIG. 4, pane 304 is in a state where only one column and 5 rows are displayed. While many examples of such properties are discussed in the context of FIGS. 3 and 4 below, some other non-limiting examples might include: a number of selections, a location of one or more selections, a type of content, content fading, text wrapping, or font size.

Figure 4:
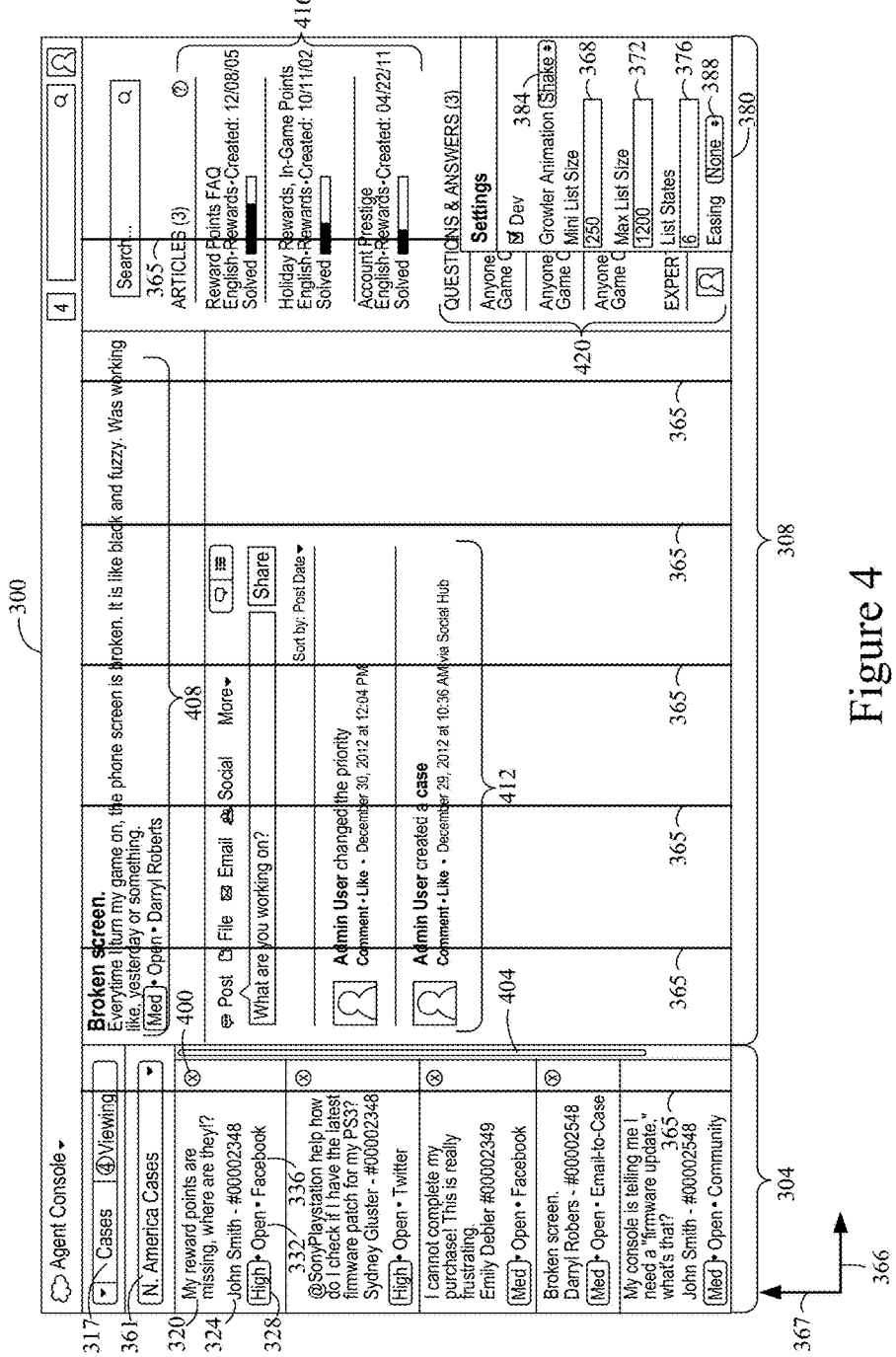
FIG. 4 shows another example of a presentation of a bounding window comprising one or more resizable panes in the form of a GUI as displayed on a computing device, performed in accordance with some implementations.

The non-limiting examples illustrated in FIGS. 3 and 4 demonstrate an example of state transitions that might occur when panes 304 and 308 are resized to traverse one or more breakpoints. For example, pane 304 is resized to become smaller, traversing several breakpoints. Some content of pane 304 disappears from view when it is decreased in size from FIG. 3 to FIG. 4. More specifically, columns describing "Category" 340, "Age" 344, "Type" 348, "Account" 352, "E-mail" 356, and "Phone" 360 disappear. While headings 318 disappear entirely, content of several columns of table 312 is relocated. For instance, the locations of content of "Subject" 320, "Contact" 324, "Priority" 328, "Status" 332, and "Origin" 336 change such that they are no longer contained in separate columns but are collapsed to become part of each individual cell. Furthermore, where the text of text of columns "Subject" 320, "Contact" 324, and "Origin" 336 was abbreviated or truncated in FIG. 3, the text of these columns becomes wrapped and fully visible as pane 304 is resized to become smaller in FIG. 4. Between FIGS. 3 and 4, some selections, namely "New View" 362, "Edit" 363, and "Delete" 364 disappear and are replaced with button 400, which can be clicked or tapped by a user to delete a case. Additionally, between FIGS. 3 and 4, scroll bar 404 also appears because as the horizontal width of the content of pane 304 is compressed, the vertical length of the content of pane 304 expands.

In some implementations, a given state of a pane can be associated with an amount of content displayed within the pane. For example, the amount of content might be proportional to the size of the pane. By way of an illustration, between FIGS. 3 and 4, pane 308 has been increased in size. Content of pane 308, which was faded in FIG. 3, becomes darkened and more visible in FIG. 4. Other content which was not visible in FIG. 3 becomes visible in FIG. 4 when pane 308 is increased in size. For example, some newly visible content includes information pertaining to a selected case. More specifically the newly visible content comprises a summary 400 of the selected case, posts 404 relating to the selected case, articles 408 relating to the selected case, and questions and answers 412 associated with the selected case.

Returning to FIG. 1, at 112, it is determined whether a request to change the spatial position of one or more breakpoints has been received. For example, in between FIGS. 3 and 4, a request to increase the number of breakpoints has been received. If such a request is received, at 116, the spatial position of one or more of the breakpoints is updated in accordance with the request. For example, in FIG. 4, the number of breakpoints increases responsive to the request. Otherwise, at 112, when such a request is not received, the spatial position of the one or more breakpoints is not updated.

Optionally, at 120, a viewport size, such as a screen size associated with a viewing device, can be determined. For instance, in some implementations, a user might be viewing bounding window 300 using a smartphone or tablet associated with a viewport size of 6 inches. On the other hand, another user might be viewing bounding window 300 with a desktop monitor associated with a viewport size of 64 inches.

Optionally, at 124, the spatial position of the one or more breakpoints is further updated according to viewport size. For example, in some implementations, in the case of a user viewing bounding window 300 using a smartphone or tablet, the number of breakpoints can be decreased due to the small viewport size. On the other hand, in some implementations, in the case of a user viewing bounding window 300 using a desktop monitor, the number of breakpoints can be increased due to the large viewport size.

In some implementations, for example, in a community of users in a social networking system, as described above, a specific user might be able to customize the spatial position of breakpoints based on her permission. For instance, a user permission associated with a user submitting a request to change the spatial position of one or more breakpoints can be determined. Ultimately, the user can be granted access to customize spatial positions of part or all of the breakpoints based at least in part on this user permission. The user permission associated with the user might include a subset of privileges available to a system administrator. As such, an administrator with more important work on her plate can delegate management of breakpoints to a trusted user by granting the trusted user permission to do so.

Figure 2:
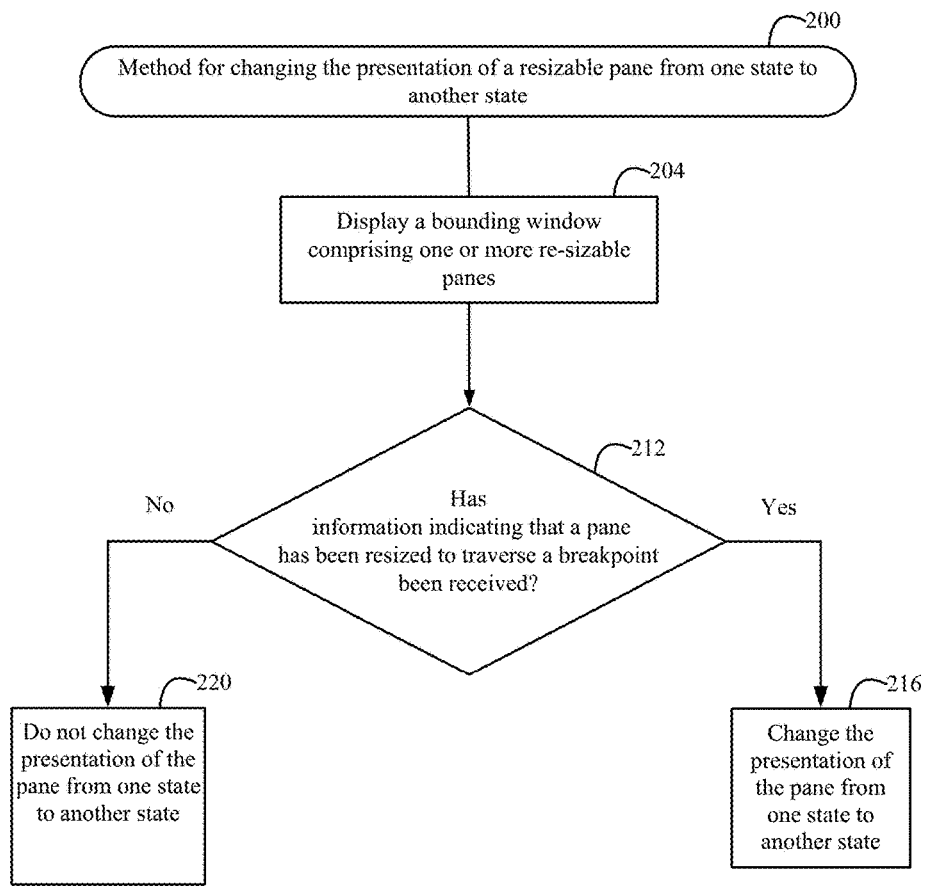
FIG. 2 shows a flowchart of an example of a computer-implemented method 200 for changing the presentation of a resizable pane from one state to another state, performed in accordance with some implementations.

FIG. 2 shows a flowchart of an example of a computer-implemented method 200 for changing the presentation of a resizable pane from one state to another state. FIG. 2 is described with reference to FIGS. 3 and 4, which each show examples of a presentation of a bounding window comprising one or more resizable panes in the form of a GUI as displayed on a computing device, in accordance with some implementations.

In the example of method 200, at 204, a bounding window 300 comprising one or more resizable panes 304 and 308, as shown in FIG. 3, is displayed in a user interface. At 212, it is determined whether information indicating that a pane has been resized to traverse a breakpoint has been received. For example, as described above, pane 304 is resized to traverse several breakpoints in FIG. 4 from FIG. 3.

If it is determined that information indicating that a pane has been resized to traverse a breakpoint has been received, at 216, the presentation of the resized pane will change states. For example, pane 304 transition from the state shown in FIG. 3 (described in further detail above) to the state shown in FIG. 4 (described in further detail above) when pane 304 is increased in size. Otherwise, at 220, the state of the resized pane will not change.

Systems, apparatus, and methods are described below for implementing database systems and enterprise level social and business information networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

By way of example, a user can update a record in the form of a CRM object, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed to the manager's feed page or other page.

Figure 6A:
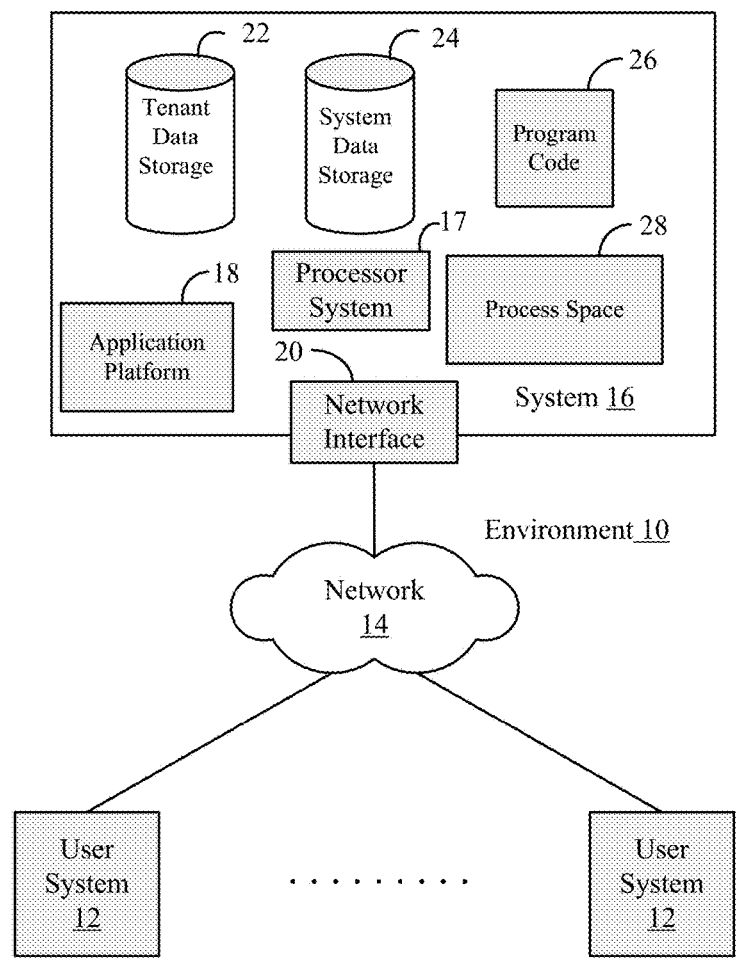
FIG. 6A shows a block diagram of an example of an environment 10 in which an on-demand database service can be used in accordance with some implementations.

FIG. 6A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 6A (and in more detail in FIG. 6B) user systems 12 might interact via a network 14 with an on-demand database service, which is implemented in the example of FIG. 6A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 6A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 6B:
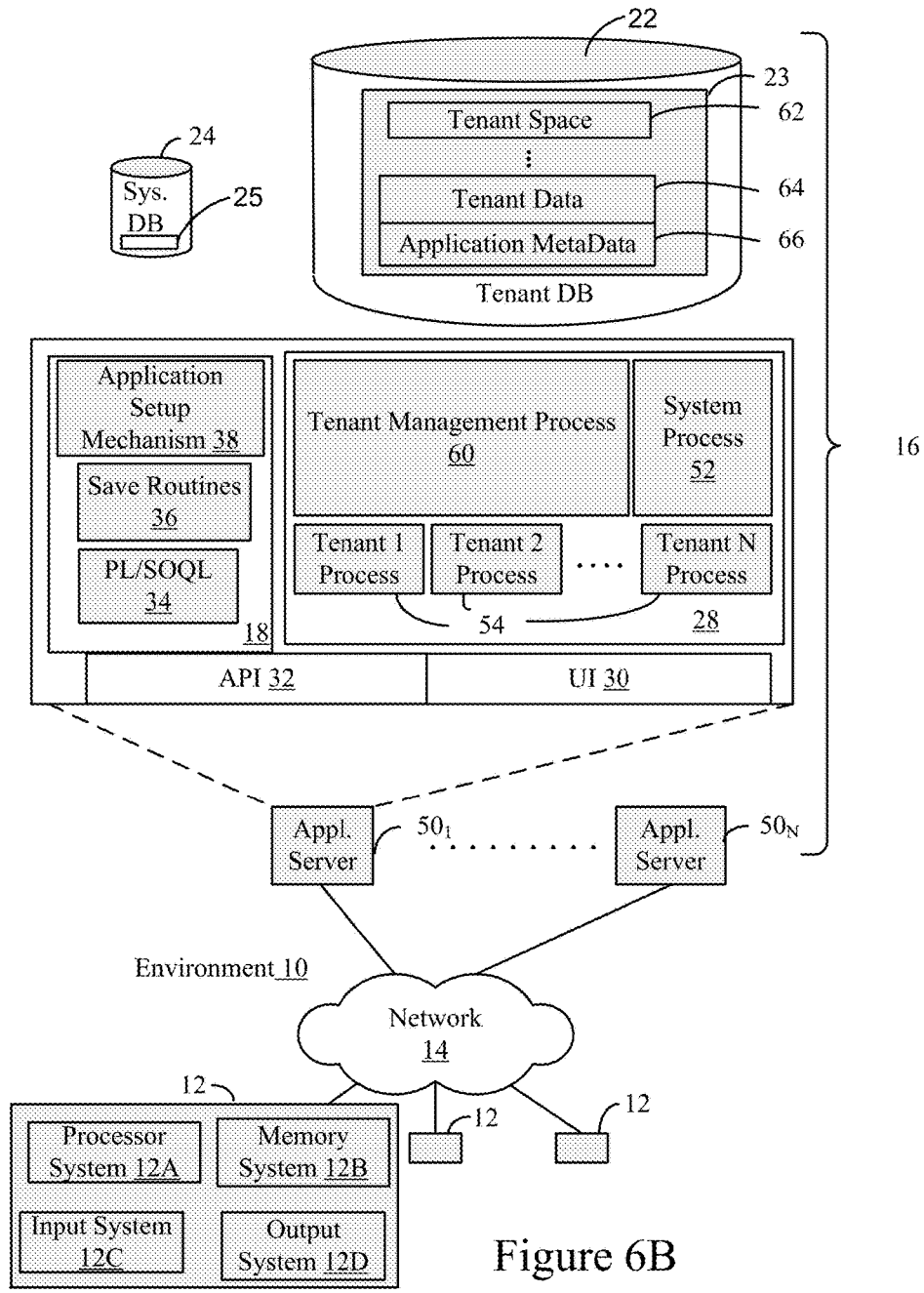
FIG. 6B shows a block diagram of an example of some implementations of elements of FIG. 6A and various possible interconnections between these elements.

One arrangement for elements of system 16 is shown in FIGS. 6A and 6B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 6A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 6B shows a block diagram of an example of some implementations of elements of FIG. 6A and various possible interconnections between these elements. That is, FIG. 6B also illustrates environment 10. However, in FIG. 6B elements of system 16 and various interconnections in some implementations are further illustrated. FIG. 6B shows that user system 12 may include processor system 12A, memory system 12B, input system 12C, and output system 12D. FIG. 6B shows network 14 and system 16. FIG. 6B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 6A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 6B, system 16 may include a network interface 20 (of FIG. 6A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 7A:
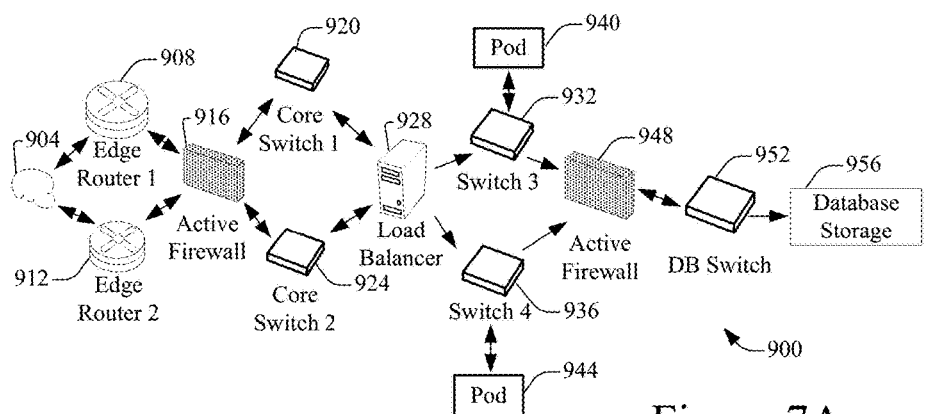
FIG. 7A shows a system diagram of an example of architectural components of an on-demand database service environment 900, in accordance with some implementations.

FIG. 7A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 7B:
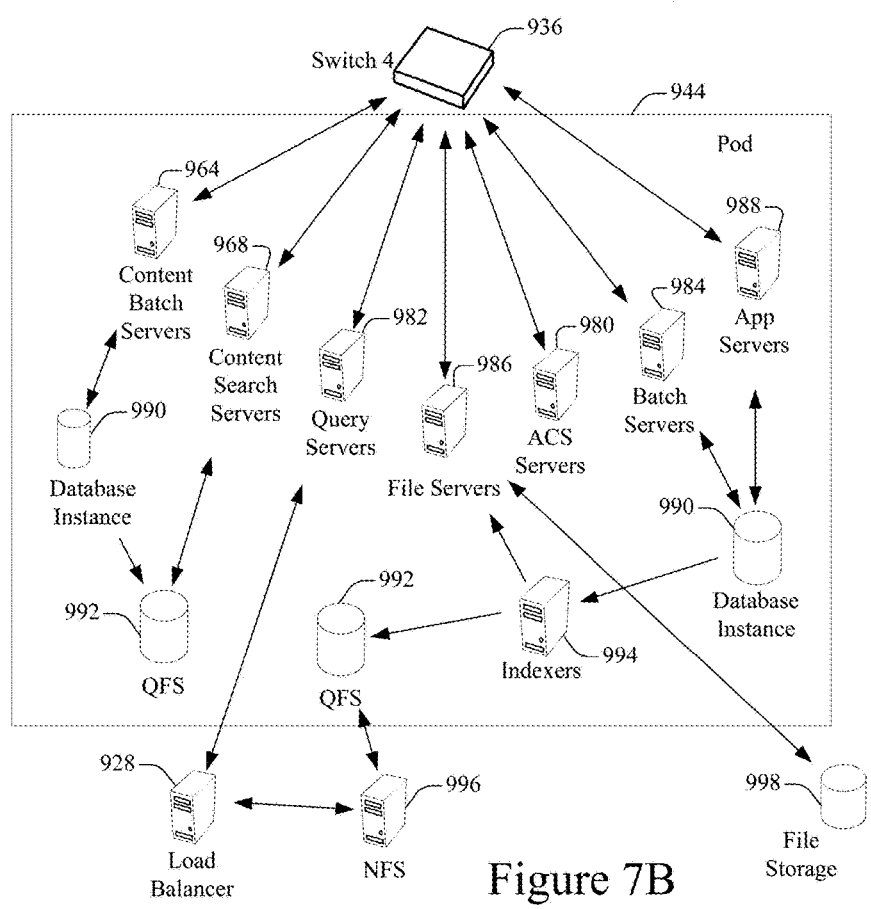
FIG. 7B shows a system diagram further illustrating an example of architectural components of an on-demand database service environment, in accordance with some implementations.

As shown in FIGS. 7A and 7B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 7A and 7B, some implementations of an on-demand database service environment may include anywhere from one to many devices of each type. Also, the on-demand database service environment need not include each device shown in FIGS. 7A and 7B, or may include additional devices not shown in FIGS. 7A and 7B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 7B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 6A and 6B.

FIG. 7B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

In some implementations, the app servers 988 may include a hardware and/or software framework dedicated to the execution of procedures (e.g., programs, routines, scripts) for supporting the construction of applications provided by the on-demand database service environment 900 via the pod 944. In some implementations, the hardware and/or software framework of an app server 988 is configured to execute operations of the services described herein, including performance of one or more of the operations of methods described herein with reference to FIGS. 1-5B. In alternative implementations, two or more app servers 988 may be included to perform such methods, or one or more other servers described herein can be configured to perform part or all of the disclosed methods.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory ("ROM") devices and random access memory ("RAM") devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A computing device configured to provide a user interface for customizing state transitions of panes in a bounding window, the device comprising:
 a display;
 a storage medium storing instructions; and
 one or more processors configured to execute the instructions to cause:
  displaying, in a user interface on the display, a bounding window comprising one or more resizable panes,
  graphically representing, in the user interface, a plurality of breakpoints, each breakpoint situated at a respective spatial position in the bounding window, each breakpoint defining a transition of a pane from one of a plurality of states to another one of the states when the pane is resized to traverse the breakpoint, a spacing between breakpoints being based at least in part on a designated formula controllable by a user of the computing device, the designated formula providing a non-uniform density of breakpoints along an axis between a first border of the bounding window and a second border of the bounding window, and updating a spatial position of one or more of the breakpoints in accordance with a request indicating user customization of the one or more breakpoints.

2. The computing device of claim 1, wherein the plurality of breakpoints is graphically represented as a plurality of lines in the user interface, each line configured to be moved responsive to input from the user.

3. The computing device of claim 2, wherein each line is configured to be moved along one or both of: a vertical axis and a horizontal axis of the user interface.

4. The computing device of claim 2, wherein lines are configured to be added or deleted responsive to input from the user.

5. The computing device of claim 1, wherein the spatial positions of the breakpoints are definable by the user in one or more editable fields in a region of the user interface, the one or more editable fields indicating one or both of: a spacing between breakpoints and a number of breakpoints in the user interface.

6. The computing device of claim 1, the one or more processors further configured to execute the instructions to cause:

determining a viewport size associated with the display, and further updating the spatial position according to the viewport size.

7. The computing device of claim 1, the one or more processors further configured to execute the instructions to cause:

determining a user permission associated with a user submitting the request, and granting the user access to customize spatial positions of part or all of the breakpoints based at least in part on the user permission.

8. A system for providing a user interface for customizing state transitions of panes in a bounding window, the system comprising:

a database system implemented using a server system comprising one or more hardware processors, the database system configurable to cause:

displaying, in a user interface on a display of a device, a bounding window comprising one or more resizable panes, graphically representing, in the user interface, a plurality of breakpoints, each breakpoint situated at a respective spatial position in the bounding window, each breakpoint defining a transition of a pane from one of a plurality of states to another one of the states when the pane is resized to traverse the breakpoint, a spacing between breakpoints being based at least in part on a designated formula controllable by a user of the computing device, the designated formula providing a non-uniform density of breakpoints along an axis between a first border of the bounding window and a second border of the bounding window, and updating a spatial position of one or more of the breakpoints in accordance with a request indicating user customization of the one or more breakpoints.

9. The system of claim 8, wherein the plurality of breakpoints is graphically represented as a plurality of lines in the user interface, each line configured to be moved responsive to input from the user.

10. The system of claim 9, wherein each line is configured to be moved along one or both of: a vertical axis and a horizontal axis of the user interface.

11. The system of claim 9, wherein lines are configured to be added or deleted responsive to input from the user.

12. The system of claim 8, wherein the spatial positions of the breakpoints are definable by the user in one or more editable fields in a region of the user interface, the one or more editable fields indicating one or both of: a spacing between breakpoints and a number of breakpoints in the user interface.

13. The system of claim 8, the database system further configurable to cause:

determining a viewport size associated with the display, and further updating the spatial position according to the viewport size.

14. The system of claim 8, the database system further configurable to cause:

determining a user permission associated with a user submitting the request, and granting the user access to customize spatial positions of part or all of the breakpoints based at least in part on the user permission.

15. A method for providing a user interface for customizing state transitions of panes in a bounding window, the method comprising:

causing display of, in a user interface on a display of a device, a bounding window comprising one or more resizable panes, causing graphical representation of, in the user interface, a plurality of breakpoints, each breakpoint situated at a respective spatial position in the bounding window, each breakpoint defining a transition of a pane from one of a plurality of states to another one of the states when the pane is resized to traverse the breakpoint, a spacing between breakpoints being based at least in part on a designated formula controllable by a user of the computing device, the designated formula providing a non-uniform density of breakpoints along an axis between a first border of the bounding window and a second border of the bounding window, and updating a spatial position of one or more of the breakpoints in accordance with a request indicating user customization of the one or more breakpoints.

16. The method of claim 15, wherein the plurality of breakpoints is graphically represented as a plurality of lines in the user interface, each line configured to be moved responsive to input from the user.

17. The method of claim 16, wherein each line is configured to be moved along one or both of: a vertical axis and a horizontal axis of the user interface.

18. The method of claim 16, wherein lines are configured to be added or deleted responsive to input from the user.

19. The method of claim 15, wherein the spatial positions of the breakpoints are definable by the user in one or more editable fields in a region of the user interface, the one or more editable fields indicating one or both of: a spacing between breakpoints and a number of breakpoints in the user interface.

20. The method of claim 15, method further comprising:

determining a viewport size associated with the display, and further updating the spatial position according to the viewport size.

* * * * *